US005346931A

United States Patent [19]

Hoffmann

[11] Patent Number: 5,346,931

[45] Date of Patent: Sep. 13, 1994

[54] COLOR FORMER PREPARATIONS

[75] Inventor: Dietrich Hoffmann, Roedersheim-Gronau, Fed. Rep. of Germany

[73] Assignee: BASF Aktiengesellschaft, Ludwigshafen, Fed. Rep. of Germany

[21] Appl. No.: 825,374

[22] Filed: Jan. 24, 1992

[30] Foreign Application Priority Data

Feb. 9, 1991 [DE] Fed. Rep. of Germany ......... 4103966

[51] Int. Cl.$^5$ ............ C08K 9/10

[52] U.S. Cl. ............ 523/201; 523/206; 523/208; 430/138; 430/338; 430/345; 524/508; 524/513

[58] Field of Search ............ 523/201, 206, 208; 430/138, 338, 345; 524/508, 513

[56] References Cited

U.S. PATENT DOCUMENTS

| | | | |
|---|---|---|---|
| 3,429,827 | 2/1969 | Ruus | 427/213.34 |
| 3,551,346 | 12/1970 | Breen et al. | 264/4.3 |
| 3,578,605 | 5/1971 | Baxter | 264/4.3 |
| 3,830,750 | 8/1974 | Wellman | 523/206 |
| 3,891,572 | 6/1975 | Moody et al. | 252/316 |
| 4,371,634 | 2/1983 | Hoffman et al. | 523/208 |
| 4,406,816 | 9/1983 | Sliwka | 521/69 |
| 4,576,891 | 3/1988 | Adair et al. | 430/138 |
| 4,592,957 | 6/1986 | Dahm et al. | 428/402.21 |
| 4,594,370 | 6/1986 | Adkins | 523/208 |
| 4,727,011 | 2/1988 | Mahabadi et al. | 430/138 |
| 4,753,968 | 6/1988 | Shioi et al. | 523/208 |
| 4,977,060 | 12/1990 | Liang et al. | 430/138 |

FOREIGN PATENT DOCUMENTS

| | | |
|---|---|---|
| 1104881 | 7/1981 | Canada . |
| 2826939 | 1/1979 | Fed. Rep. of Germany . |
| 1603448 | 11/1981 | United Kingdom . |

OTHER PUBLICATIONS

Journal of Imaging Technology, vol. 16, No. 6, Dec. 1990, pp. 234–237, T. Usami, et al, "Transparent Thermal Film".

Patent Abstracts of Japan, vol. 11, No. 356, (M-644) [2803], Nov. 20, 1987, & JP-A-62 132673, Jun. 15, 1987, H. Okuda, "Recorder".

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

Color former preparations comprising

A) a core of solid particles of a color former,

B) a first envelope of a water-soluble nonionic polymer, and

C) a second envelope of a crosslinked polymer, are useful for producing heat- and pressure-sensitive recording materials.

8 Claims, No Drawings

COLOR FORMER PREPARATIONS

The present invention relates to novel color former preparations comprising

A) a core of solid particles of a color former,

B) a first envelope of a water-soluble nonionic polymer, and

C) a second envelope of a crosslinked polymer.

The present invention further relates to aqueous dispersions which contain one or more of these color former preparations and also to those dispersions which additionally contain one or more electron acceptors as color developer.

The present invention also relates to the use of the color former preparations for preparing heat- and pressure-sensitive recording materials and to these recording materials themselves.

The structure and functioning of pressure- and heat-sensitive recording materials are well known.

Atop a support, in general a piece of paper, cardboard or film, is a pressure- or heat-sensitive coating which contains a colorless or only slightly colored color former which in contact with an electron acceptor gives a color reaction.

Especially in the case of pressure-sensitive systems this coating is made of microcapsules which contain the color former dissolved in involatile or only sparingly volatile solvents (core oils) and which are destroyable by application of pressure or indeed by local heating, if the softening temperature of the wall material is right. The color former released in this way then comes into contact with the acidic color developer, dispersed either in the same layer or in a second layer on the same support or, as in carbonless copy papers, on the opposite side of a further sheet of paper.

In heat-sensitive systems, the usually nonencapsulated color former and the developer are in one and the same layer, dispersed as disconnected particles in a binder. On heating, the components melt and thus make it possible for the color-forming reaction to take place between the color former and the developer.

Especially with the last-mentioned systems the problem is that quality-diminishing background colorings can appear even in the course of the preparation of the systems. These background colorings are due to predevelopment of the color former, on the one hand in the course of its extremely fine milling in an aqueous medium to prepare a dispersion, in particular in the presence of polyvinyl alcohol as dispersant, and on the other in particular if inexpensive, slightly water-soluble developers are used, due to the color former and the developer reacting when their aqueous dispersions are applied to the paper surface. This is the case in particular with rapidly reacting systems of reactive components, as required for example for the telefax process.

Background colorings in the case of heat-sensitive systems cannot even be completely avoided by microencapsulation, since small amounts of nonencapsulated color former are always present. Moreover, the wall material has to meet special requirements, since it must soften at a suitable (not too high) temperature.

It is an object of the present invention to provide color former preparations which make it possible to prepare in an inexpensive manner heat- and pressure-sensitive recording materials which are free of background coloring.

We have found that this object is achieved by color former preparations comprising A) a core of solid particles of a color former, B) a first envelope of a water-soluble nonionic polymer, and C) a second envelope of a crosslinked polymer.

We have further found a process for preparing these color former preparations by a) enveloping solid color former particles with a water-soluble nonionic polymer by milling the color former with the polymer in aqueous dispersion, and b) further enveloping the particles obtained in step a) with a crosslinked polymer by adding an aqueous dispersion of an oligomer precursor thereof and curing it to form a continuous layer which envelopes the particles obtained in step a).

The present invention further provides aqueous dispersions containing one or more of these color former preparations and also aqueous dispersions containing one or more of these color former preparations and also one or more electron acceptors as developer.

Finally, the present invention provides for the use of these color former preparations for preparing heat- and pressure-sensitive recording materials and also these recording materials themselves.

The color former preparations of the present invention contain a core of solid particles of a color former. Suitable for this purpose are those color formers which are known for use in heat- and pressure-sensitive recording media and which themselves are colorless or barely colored and develop their color on contact with an electron acceptor by donation of an electron or acceptance of a proton.

Preferred color formers are for example lactones such as, in particular, crystal violet lactone and the rhodamine and diazarhodamine lactones, phthalides, spirodipyrans such as in particular spirodibenzopyrans and especially fluorans.

Since there are many purposes, including the telefax process, for which it is desirable to have color formers which produce a black color, particular preference is given for example to 2-N-phenylamino-3-methyl-6-dialkyl- or -diaryl-aminofluorans.

Of these, 2-N-phenylamino-3-methyl-6-diethylaminofluoran

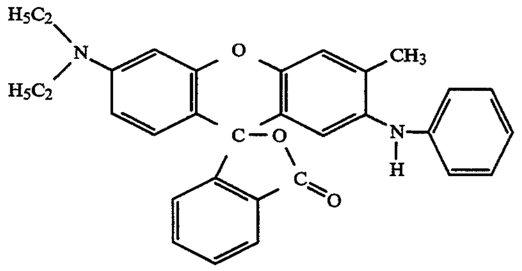

is particularly notable because of its high reactivity.

To obtain a desired color, for example black, it is of course also possible to use color former mixtures which may also contain color formers from more than one of the classes mentioned.

The first envelope enclosing the core of solid color former consists of a water-soluble nonionic polymer. Suitable for this purpose are in particular those polymers which contain no free hydroxyl groups, e.g. polyalkylene glycol ethers such as polyethylene, polypropylene or polybutylene glycol ethers and methylcellulose having a very high proportion of etherified hydroxyl groups. It is particularly advantageous to use polyvinylpyrrolidone, which in general has a K value of from 10 to 100, preferably from 30 to 90 (K value determined by the method of H. Fikentscher, Cellulosechemie 13 (1932), 48–64, 71–74, in 1% strength by weight (or in 5% strength by weight in the case of K values below 30) aqueous solution at 25° C.).

The second envelope is constituted by a crosslinked polymer. Suitable for this purpose are commercial thermoplastic polymers such as polyamides, polyurethanes, polyisocyanates, polyacrylates, copolymers of acrylates and methacrylates, polybutadiene, polycondensates of urea, melamine, phenol and formaldehyde, and also gelatin, which have been cured in a conventional manner and hence rendered essentially water-insoluble. Particular preference is given to a crosslinked melamine-formaldehyde resin, described for example in U.S. Pat. No. 4,406,816.

The color former preparations of the present invention are advantageously obtainable in two process steps.

The first envelope is advantageously applied by grinding the color former in the presence of an aqueous dispersion of the water-soluble nonionic polymer, preferably a polyvinylpyrrolidone dispersion which generally has a polyvinylpyrrolidone content of from 1 to 20% by weight, preferably from 5 to 15% by weight, to a particle size of customarily 0.1–3 μm in an aqueous medium. The grinding advantageously takes place in a bead mill. In general, the amount of polymer employed is from 0.1 to 10, preferably from 0.5 to 5, % by weight, based on the color former. It is frequently of advantage to add viscosity-reducing agents such as acrylic acid/styrene copolymers in amounts of, in general, from 1 to 20, preferably from 5 to 15, % by weight, based on solid polyvinylpyrrolidone.

To form the second envelope, the color former dispersion obtained in the first process step is generally admixed with a protective colloid and an oligomer, which is subsequently cured to completion, for example by addition of an acid, and precipitates on the pretreated color former particles.

For this purpose it is preferable to use from 1 to 20, preferably from 5 to 10, % by weight, based on the color former, of a mixture of a 20% strength by weight aqueous solution of polyacrylamidomethylenepropanesulfonic acid and a 70% strength by weight aqueous solution of melamine-formaldehyde resin in a weight ratio of 1:1. The curing is advantageously effected by addition of in general from 0.1 to 5, preferably from 1 to 3, % by weight, based on the color former, of an electrolyte such as an alkali metal or alkaline earth metal salt of an inorganic acid, e.g. sodium chloride, potassium chloride, disodium hydrogenphosphate or in particular sodium dihydrogenphosphate, and of an acid such as formic acid, with which a pH of about 3.5–4.5 is set, at about 70° C.

The color former preparations of the present invention have the great advantage of having no visible self-coloring, since any premature development of the color former in the course of the fine grinding required for the coating of heat- and pressure-sensitive papers is prevented by the addition of the polymers mentioned, in particular polyvinylpyrrolidone.

Furthermore, their aqueous dispersions can be mixed with aqueous developer dispersions without the appearance of color. The reaction of the color former with any dissolved developer present is prevented by the double envelope around the color former. The mixtures are generally stable far beyond 24 hours, so that they can easily be used for other purposes.

It is also possible to coat the surface of the developer with polymer. However, in general this is not necessary, since the envelope around the color former provides adequate protection.

The color former preparations of the present invention can advantageously be used in heat- and pressure-sensitive recording materials.

These materials are prepared in a conventional manner. Approximately 40% strength by weight aqueous dispersions of the color former preparations are mixed with approximately 55% strength by weight aqueous developer dispersions in a weight ratio of from about 1:4 to 1:15, depending on the nature of the color former and the developer, and applied in a layer thickness of from about 4 to 7 $g/m^2$ to the support, usually paper, the surface of which will in general have been smoothed. The paper thus coated is subsequently dried.

Suitable developers are the electron acceptors known for use in heat- and pressure-sensitive recording materials. They are for example those based on silicates such as activated and acid clay, attapulgite, bentonite, colloidal silicon dioxide and aluminum, magnesium and zinc silicates, carboxylic acids such as oxalic, maleic, succinic, tartaric, citric, stearic, benzoic or p-tert-butylbenzoic acid, phthalic acid, gallic acid, salicylic acid and substituted salicylic acid such as 3-isopropyl-, 3-cyclohexyl-, 3,5-di-tert-butyl- or 3,5-di(2-methylbenzyl)-salicylic acid, phenol derivatives such as 4,4'-isopropylidenediphenol, -bis(2-chlorophenol), -bis(2,6-dichlorophenol),-bis(2,6-dibromophenol),-bis(2,6-dimethylphenol) or -bis(2-tert-butylphenol),2,2'-methylene-bis(4-chlorophenol) or-bis(4-methyl-6-butylphenol), 4,4'-sec-butylidenediphenol, 4,4'-cyclohexylidenediphenol or -bis(2-methylphenol), 2,2'-dihydroxybiphenyl, 4-tert-butyl- or 4-phenylphenol, phenolic resins, α- or β-naphthol, methyl 4-hydroxybenzoate, and also salts of these organic acceptors.

Developers based on phenol are preferred for the recording materials of the invention. Of the phenol-based developers, 4,4'-isopropylidenediphenol (bisphenol A) is particularly preferred.

The recording materials of the invention may contain further customarily used additives in the heat- or pressure-sensitive layer. Such additives are for example lubricants, such as zinc stearate, which contribute to smoothing the paper surface. It is also possible to use sensitizers in particular in heat-sensitive layers. Sensitizers are specific waxes of low melting point, which serve to lower the softening temperature and hence to speed up development.

The pressure- and heat-sensitive recording materials of the invention have no visible background colorings. Photometric measurements indicate intensity values distinctly below 1 K/S×100. The intensities of the blacks, or colors in general, which are obtained on printing are distinctly above 40 K/S×100 (evaluation by Kubelka-Munk; Kunststoff-Rundschau 17 (1970), 282–291). This clearly meets the requirements for such materials.

The recording materials of the invention moreover have the great advantage that the color former and the developer are completely freely choosable, including particularly reactive color formers and water-soluble developers. This also means that the also particularly inexpensive components 2-N-phenylamino-3-methyl-6-diethylaminofluoran and bisphenol A can be used, so that it is possible to prepare fast-reacting systems which produce deep blacks.

EXAMPLES a) Preparation of color former preparations

EXAMPLE 1

10 g of the color former 2-N-phenylamino-3-methyl-6-diethylaminofluoran were bead milled with 15 g of water and 1 g of a 10% strength by weight aqueous dispersion of polyvinylpyrrolidone (K 30) until the average particle size was 1 μm.

The color former dispersion pretreated in this way was then admixed by stirring first with 1.9 g of a mixture of a 70% strength by weight aqueous solution of melamine-formaldehyde resin (molar ratio melamine:formaldehyde=1:5.6–1:6.2) and a 20% strength by weight aqueous solution of polyacrylamidomethylenepropanesulfonic acid in a weight ratio of 1:1 and then with 0.22 g of sodium dihydrogenphosphate. The mixture was then adjusted with formic acid to pH 4.2. After stirring at room temperature for one hour following addition of 2.5 g of water, the mixture was stirred at 70° C. for a further 2 h until completely cured.

The result was an approximately 35% strength by weight aqueous dispersion of 2-N-phenylamino-3-methyl-6-diethylaminofluoran which was free of any visible coloring. Photometry revealed an intensity value of 0.1 K/S×100.

EXAMPLES 2 TO 5

The color former preparations mentioned below in the Table were prepared in a similar manner to Example 1 and had similar self-color intensities within the range from 0.1 to 0.6 K/S×100.

b) Use of the color former preparations for producing heat-sensitive recording materials.

The color former dispersions obtained under a) were diluted to a color former content of 13% by weight and mixed in a weight ratio of 1:1 with a 55% strength by weight aqueous dispersion of bisphenol A.

To assess the coloring due to these thermodispersions, photometric measurements were carried out with a Zeiss Elrepho photometer and evaluated by Kubelka-Munk in K/S×100. The results after standing for 5, 60 and 180 minutes are listed below in the Table.

To produce the heat-sensitive recording materials, the thermodispersions were applied with a 30 μm doctor blade to base paper in such a way as to produce a layer thickness of about 6 g/m². The coated paper was dried with hot air at not more than 50° C.

These heat-sensitive layers were each developed in the F+O Electronics Systems thermal printer from Neckarsteinach GmbH of type 180/300 TES 9024 B using heat pulses of 7 msec. The resulting blacks (or blue coloring in the case of Example 4) were evaluated by Kubelka-Munk in K/S×100. The results are summarized in the following Table:

| Example | Color former | Coloring of thermodispersions in K/S × 100 after standing for | | | Color strength on development in |
|---|---|---|---|---|---|
| | | 5 min | 60 min | 180 min | K/S × 100 |
| 1 | 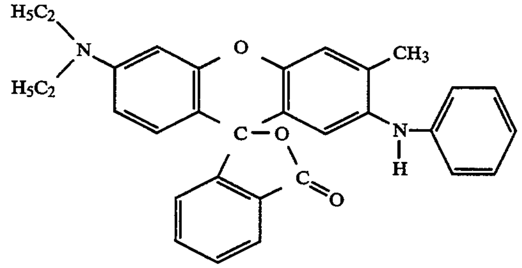 | 0.2 | 0.3 | 0.5 | 44.6 |
| 2 | 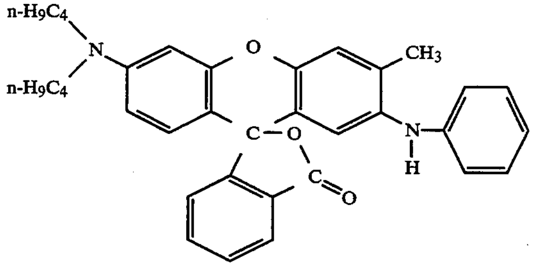 | 0.2 | 0.2 | 0.2 | 51.2 |

-continued

| Example | Color former | Coloring of thermodispersions in K/S × 100 after standing for 5 min | 60 min | 180 min | Color strength on development in K/S × 100 |
|---|---|---|---|---|---|
| 3 | 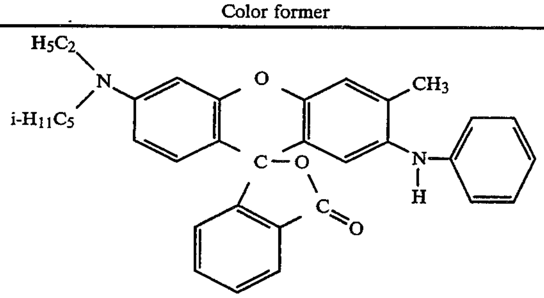 | 0.2 | 0.2 | 0.3 | 46.5 |
| 4 | 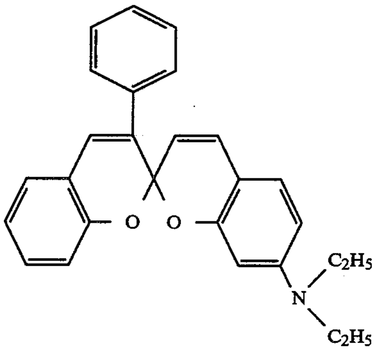 | 0.5 | 0.6 | 0.7 | 62.5 |
| 5 | Mixture of Ex. 1/Ex. 4 in a weight ratio of 70:30 | 0.3 | 0.4 | 0.4 | 40.3 |

I claim:

1. A color former comprising

A) a core of solid particles of a color former containing a colorless or barely colored color former of fluorans, lactones, phthalides or spirodipyrans which in contact with an electron acceptor gives a color reaction, B) a first envelope of a water-soluble nonionic polymer, and C) a second envelope of a crosslinked polymer.

2. A color former as claimed in claim 1, wherein the first envelope of a water-soluble nonionic polymer B) is a polyalkylene glycol ether, etherified methycellulose or polyvinylpyrrolidone, and the second envelope of a crosslinked polymer C) is a polyamide, polyurethane, polyisocyanate, polyacrylate, copolymer of an acrylate and methacrylate, polybutadiene, polycondensate of urea, melamine, phenol and formaldehyde or water-insoluble gelatin.

3. A color former preparation as claimed in claim 1, obtained by a) enveloping solid color former particles with a water-soluble nonionic polymer by milling the color former with the polymer in aqueous dispersion, and b) further enveloping the particles obtained in step a) with a crosslinked polymer by adding an aqueous dispersion of an oligomer precursor thereof and curing it to form a continuous layer which envelopes the particles obtained in step a).

4. A process for preparing a color former preparation as claimed as claim 1, comprising the steps of a) enveloping solid color former particles with a water-soluble nonionic polymer by milling the color former with the polymer in aqueous dispersion, and b) further enveloping the particles obtained in steep a) with a crosslinked polymer by adding an aqueous dispersion of an oligomer precursor thereof and curing it to form a continuous layer which envelopes the particles obtained in step a).

5. An aqueous dispersion containing one or more color former preparations as claimed in claim 1.

6. An aqueous dispersion containing one or more color former preparations as claimed in claim 1 and one or more electron acceptors as developer.

7. A method for preparing heat- or pressure-sensitive recording materials, comprising employing a color former preparation as claimed in claim 1 in their preparation.

8. A heat- or pressure-sensitive recording material, containing one or more color former preparations as claimed in claim 1.

* * * * *